(12) United States Patent
Bühler et al.

(10) Patent No.: US 8,733,230 B2
(45) Date of Patent: May 27, 2014

(54) PUMP FOR LIQUID BEVERAGE PREPARATION DEVICES

(75) Inventors: Leo Bühler, Wädenswil (CH); Stefan Etter, Kehrsatz (CH); Thomas Hodel, Hagendorn (CH); Renzo Moser, Gümmenen (CH); Michael Meier, Kloten (CH)

(73) Assignee: Nestec S.A., Vevey (CH)

( * ) Notice: Subject to any disclaimer, the term of this patent is extended or adjusted under 35 U.S.C. 154(b) by 655 days.

(21) Appl. No.: 12/994,024

(22) PCT Filed: May 25, 2009

(86) PCT No.: PCT/EP2009/056292
§ 371 (c)(1),
(2), (4) Date: Dec. 22, 2010

(87) PCT Pub. No.: WO2009/150030
PCT Pub. Date: Dec. 17, 2009

(65) Prior Publication Data
US 2011/0107920 A1  May 12, 2011

(30) Foreign Application Priority Data

May 28, 2008  (EP) .................................. 08157066

(51) Int. Cl.
*A47J 31/043*  (2006.01)
(52) U.S. Cl.
USPC .......................................................... 99/292

(58) Field of Classification Search
USPC ....... 99/292, 302 R, 300, 295, 279, 293, 283, 99/290, 305, 299, 307
See application file for complete search history.

(56) References Cited

U.S. PATENT DOCUMENTS 2,715,868 A    8/1955  Brown ............................. 99/302
(Continued)

FOREIGN PATENT DOCUMENTS

AU          1654976 A       2/1978
DE    20 2004 020 905       4/2006
(Continued)

OTHER PUBLICATIONS

International Search Report and Written Opinion, PCT/EP2009/056292, mailed Oct. 7, 2009.

*Primary Examiner* — Dana Ross
*Assistant Examiner* — John Wasaff
(74) *Attorney, Agent, or Firm* — Winston & Strawn LLP

(57) ABSTRACT

Devices for the preparation of a liquid food or beverage. One device includes a housing, pump, pump support for securing the pump to the housing, a rigid duct that is connected by an elastic sealing member to the housing and to an inlet or outlet of the pump. The pump support includes an elastic support member for resiliently supporting the pump chamber in the housing. Another device includes a pre-suction chamber connected to a liquid inlet of a pump and being designed to intermittently provide liquid to said liquid inlet. A further device includes a connector of at least one elastic sealing member designed to absorb vibrations from a pump of the device and to enable a relative movement of a duct and a liquid inlet or outlet of the pump.

19 Claims, 3 Drawing Sheets

(56) References Cited

U.S. PATENT DOCUMENTS

| | | | |
|---|---|---|---|
| 2,958,296 A | 11/1960 | Carter | 103/218 |
| 5,392,694 A | 2/1995 | Muller et al. | 99/295 |
| 5,943,472 A | 8/1999 | Charles et al. | 392/396 |
| 5,992,298 A | 11/1999 | Illy et al. | 99/281 |
| 6,554,588 B1 | 4/2003 | DiBenedetto | 417/417 |
| 2007/0298953 A1* | 12/2007 | Gavillet et al. | 493/108 |
| 2008/0050480 A1 | 2/2008 | Majer | 426/231 |

FOREIGN PATENT DOCUMENTS

| | | |
|---|---|---|
| EP | 0 288 216 B1 | 10/1988 |
| EP | 1600086 A1 | 11/2005 |
| EP | 1 676 509 A1 | 7/2006 |
| FR | 2214069 A | 8/1974 |
| JP | 2006144661 | 1/1994 |
| JP | 06021529 A | 6/2006 |
| WO | WO2006/032599 A2 | 3/2006 |

* cited by examiner

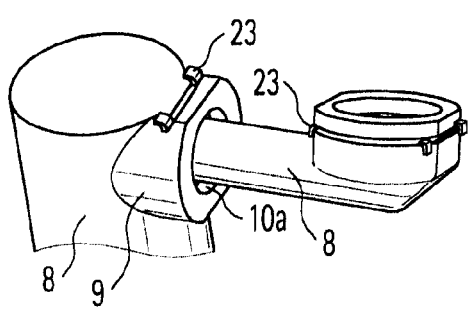
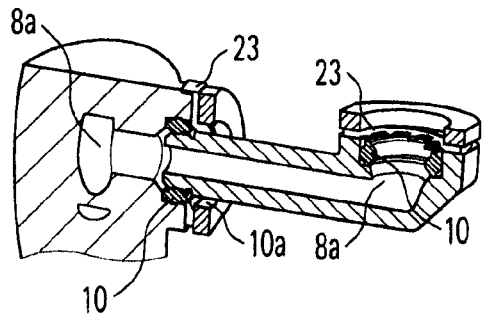
Fig. 3a    Fig. 3b
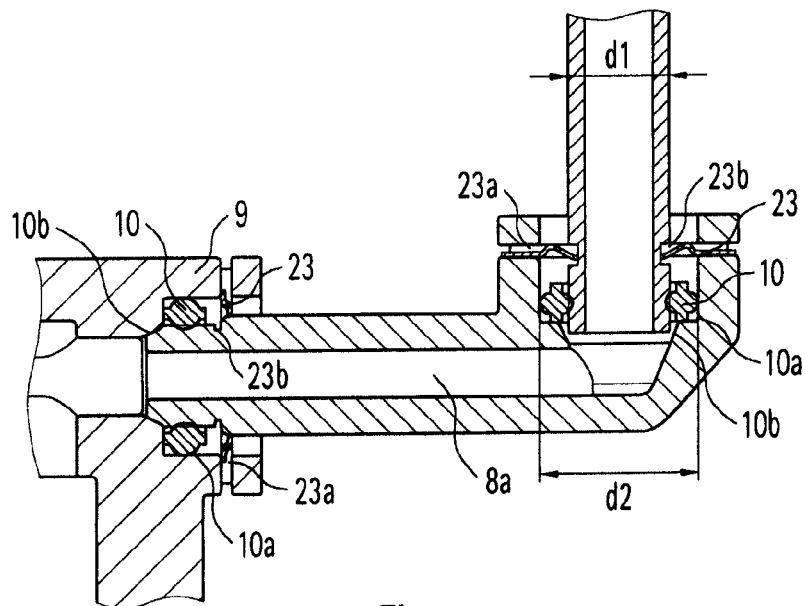
Fig. 4a
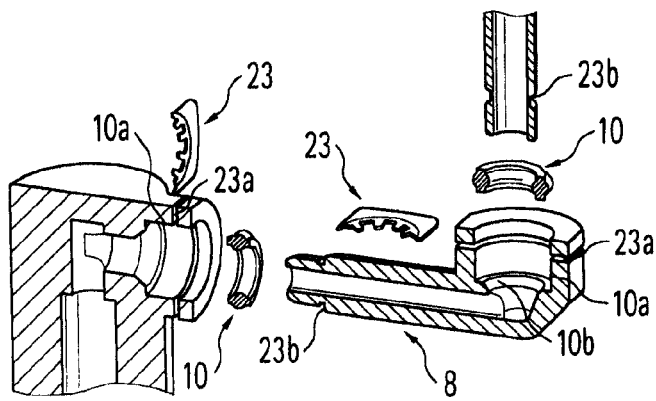
Fig. 4b

PUMP FOR LIQUID BEVERAGE PREPARATION DEVICES

This application is a 371 filing of International Patent Application PCT/EP2009/056292 filed May 25, 2009.

FIELD OF THE INVENTION

The present invention relates to a pump for a device for the preparation of liquid food or a beverage. More particularly, the present invention relates to an elastic support member for resiliently supporting the pump within the housing of the device.

BACKGROUND OF THE INVENTION

Beverage preparation machines have been known for a number of years. For example, U.S. Pat. No. 5,943,472 discloses a water circulation system between a water reservoir and a hot water or vapour distribution chamber of an espresso machine. The circulation system includes a valve, a metallic heating tube and a pump that are connected to the reservoir via different silicone hoses, which are joined using clamping collars.

The known beverage preparation devices are equipped with various types of pumps for promoting liquid within the device.

For instance, U.S. Pat. No. 2,715,868 discloses a beverage preparation machine for extracting a beverage ingredient within an extraction chamber supplied in a cartridge by water guided into the extraction chamber and forced through the cartridge. The pump is of the rotary type and has blades operating in a pump chamber to transfer liquid under pressure to the extraction chamber.

U.S. Pat. No. 5,392,694 discloses an espresso machine with a piston pump mounted in the machine's housing. The pump has a reciprocating piston that is actuated by an eccentric drive having a connecting rod that is engaged with the piston.

U.S. Pat. No. 5,992,298 discloses a beverage preparation machine with a vibrating pump suspended in mobile or overhung manner, the vibrations being transferred to an in-line heater to vibrate the heater with the view of reducing liming in the heater.

U.S. Pat. No. 6,554,588 discloses a composite piston for vibration pumps suitable for use in espresso machines.

In general, during operation of the pump of such a device, vibrations occur due to an oscillating or rotational movement of a driven part, e.g. a piston or a number of blades, housed within a pump chamber of the pump. These vibrations may then be transferred to the housing of the device and thus negatively affect the quality or operational feel of the beverage preparation device. Moreover, the vibrations may negatively affect other components housed within the housing of the device.

To overcome this problem, a device is sought-after to reduce these vibrations of the pump which are transmitted to the housing of the device.

Therefore, based on the prior art, the present invention seeks to provide a support for mounting a pump of the device in the housing in order to prevent a transmission of vibrations from the pump to the housing.

The present invention seeks to address the above described problems. The invention also aims at other objects and particularly the solution of other problems as will appear in the rest of the present description.

OBJECT AND SUMMARY OF THE INVENTION

In a first aspect, the invention relates to a device for the preparation of a liquid food or beverage composition on the basis of portioned ingredients housed within a beverage preparation chamber, the device comprising: a housing, a pump comprising a pump chamber that vibrates during use, in particular a pump chamber containing a piston moveably mounted therein, the pump further comprising a liquid inlet and a liquid outlet, a liquid supply which is in fluid connection with the inlet of the pump, the beverage preparation chamber being in fluid connection with the outlet of the pump, a pump support connected to the housing of the device at which the pump is mounted.

Preferably, the pump support comprises an elastic support member, in particular one or more leaf springs or a bellow-shaped elastic support member, for resiliently supporting the pump. The elastic support member can be arranged to be deformable around a plurality of flexion axes to absorb vibrations from the vibrating pump chamber. In particular, a single elastic element may have a plurality of spaced apart flexion axes, especially flexion axes oscillating in opposition to one another.

Moreover, the device may include a rigid duct that is mechanically connected to the housing and to the pump inlet and/or to the pump outlet and that is arranged to guide liquid away from the pump or towards the pump. The duct is preferably connected with the pump inlet and/or the pump outlet by an elastic sealing member for resiliently connecting the rigid duct to the vibrating pump chamber.

The elastic support member and elastic sealing member are preferably arranged to inhibit transmission of vibrations from the pump chamber.

With a device according to the present invention, it is possible to provide a liquid to portioned ingredients housed within the beverage preparation chamber. Accordingly, said liquid provided by the liquid supply is made to interact with portioned ingredients within the beverage preparation chamber in order to form a liquid comestible, for example a soup or a beverage.

The liquid supply may be a water reservoir connected to the device or a connection to a water tap. The liquid supply is preferably connected to the housing of the device in a detachable manner.

The pump is preferably a magnetically activated vibrating pump well known in the field of beverage preparation machines, in particular coffee machines. An example for the kind of pump to be used with the present device is described in EP 288216 A1. Thereby, the pump comprises a piston which is magnetically interacting with a solenoid arranged about the periphery of the pump chamber in which the piston is moveably mounted. Hence, by activation of the piston due to the solenoid, liquid can be sucked from the liquid inlet of the pump and can be delivered under pressure to the liquid outlet thereof.

It should be understood that the pump of the present device is not limited to the above explained embodiment and principle. Any other pump suitable for delivering a liquid to the beverage preparation chamber of the device may be applied to the device. Thereby, in particular a pump of a rotary type which is equipped with blades operating in the pump chamber may be applied to the device.

As the pump is mounted at the housing of the device by means of an elastic support member, in particular a bellow-shaped support member, vibrations which occur during operation of the pump can be effectively inhibited from being transmitted to the housing of the device. Hence, the elastic support member is arranged to dampen and/or substantially absorb the vibrations of the pump chamber and thus, to prevent a transmission of the vibrations from the pump chamber to the housing of the device.

A bellow-shaped pump support is one example for a resilient mounting of the pump. Moreover, the bellow-shaped support member enables a movement of the pump in all three degrees of freedom. Hence, a lateral, axial and rotative movement of the pump is enabled which results in an enhanced absorption of the vibrations emitted by the pump. Thereby, the movement of the pump with respect to the housing is dependent on the rigidity of the bellow-shaped support member.

Moreover, with a bellow-shaped elastic support member, an effective absorption of vibrations of the pump is enabled independent of the type of pump. Hence, axial, lateral and radial vibrations emitted by the pump due to an axial or rotational movement of a piston or blades housed within the pump chamber are effectively absorbed by the support member.

In a preferred embodiment, the support member is of elastic material such as resilient plastic and/or elastomer. According to this embodiment, the vibrations of the pump can effectively be suppressed by the elastic support member, since a movement of the support member is facilitated due to its elasticity and low rigidity.

Preferably, the elastic support member and the pump support are formed as integral parts. Hence, mounting of the support member with the elastic member to the pump is facilitated.

Preferably, the elastic support member comprises electric connection means for connecting the pump of the device. Thereby, the electrical connection means are preferably wires or any conductive materials suitable for conducting an electric current. Hence, the pump of the device can be connected to a control unit or a power supply for example by means of the electric connection means.

In a preferred embodiment, the electric connection means are incorporated into the support member. Preferably, the connection means are fully coated by the elastic support member and comprise at least a connection at either side of the support member for electrically connecting the pump to a control unit or a power supply. The electric connection means may be coated by means of injection moulding process for example.

Accordingly, no additional wires have to be provided for the operation of the pump. Thus, a very space-saving arrangement of the support member and the pump is obtained.

By combining the support member with the electric connection of the pump, no additional assembly step is needed for establishing an electric connection to the pump. In particular, by avoiding standard deformable cables for the electric connection of the pump, the assembly process may be fully automatic, without the need for a human intervention.

The pump support is preferably connected to the liquid inlet and/or the liquid outlet of the pump. Accordingly, an effective absorption of the vibrations of the pump can be achieved and the transmission of vibrations from the pump to the housing or other parts of the device housed therein can be effectively prevented.

In a preferred embodiment, the connection between the liquid outlet of the pump and the beverage preparation chamber is established by a rigid duct in particular a rigid tube member. The duct is preferably connected to the outlet of the pump by means of a connector. Such connector preferably comprises an elastic sealing member to resiliently connect the outlet of the pump and thus the pump chamber to the rigid duct.

Hence, the vibrations due to the operation of the pump are dampened by said elastic sealing member. Accordingly, transmission of the vibrations of the pump to other parts within the housing of the device and in particular the transmission of vibrations to the duct or tube member and to other parts connected thereto can be suppressed.

Moreover, the elastic sealing member is arranged to seal the connection between the liquid outlet of the pump and the duct such that no liquid may leave the connection. In addition, the elastic sealing member is designed to enable a pivotally movement of the duct with respect to the liquid outlet of the device to further dampen the transmission of vibrations of the pump.

It should be understood that a rigid duct according to the invention may be connected to the liquid inlet of the pump as well. Hence, the transmission of vibrations from the pump chamber to other parts within the housing of the device and in particular the transmission of vibrations to the duct at the liquid inlet and to other parts connected thereto such as the liquid supply can be suppressed.

In a second aspect, the invention relates to a device for the preparation of a liquid food or a beverage, the device comprising: a housing, a pump comprising a pump chamber, the pump further comprising a liquid inlet and a liquid outlet, a liquid supply which is in fluid connection with the liquid inlet of the pump, the beverage preparation chamber being in fluid connection with the liquid outlet of the pump, a pump support connected to the housing of the device at which the pump is mounted, and a pre-suction chamber connected to the liquid inlet of the pump and being designed to intermittently provide liquid to the liquid inlet of the pump.

With a device according to this invention, it is possible to provide a liquid to portioned ingredients housed within the beverage preparation chamber of the device and to hence enable an interaction of the ingredients and the liquid to form a liquid comestible, for example a soup or a beverage. Thereby, liquid from the liquid supply is provided to the beverage preparation chamber by means of the pump of the device.

As the pre-suction chamber is designed to intermittently provide liquid to the liquid inlet of the pump, the suction efficiency of the pump is enhanced. Preferably, the pre-suction chamber is designed to be driven by the vibrations of the pump. Thereby, the vibrations of the pump induce an oscillating movement of the pre-suction chamber such that the volume of the chamber is intermittently changing.

The pre-suction chamber preferably comprises a liquid inlet and a liquid outlet, the liquid inlet being in fluid connection with the liquid supply, the liquid outlet being in fluid connection with the liquid inlet of the pump. Accordingly, the pre-suction chamber is disposed within the fluid connection between the liquid supply and the pump.

Due to the intermittently change of volume of the pre-suction chamber caused by the vibrations of the pump, the pre-suction chamber acts as a pre-pump membrane thus enhancing the fluid load behaviour of the pump. Accordingly, the pump performance is increased.

In a preferred embodiment, the pre-suction chamber is at least partially enclosed by an elastic support member, in particular a bellow-shaped support member, of the pump support disposed at the liquid inlet of the pump. Thereby, the vibrations of the pump are absorbed by the elastic support member, thus resulting in an oscillating or intermittent movement of the elastic member. Accordingly, the vibrations of the pump can be used to enhance the pump efficiency. Moreover, no additional drive means for driving the pre-suction chamber have to be provided. Furthermore, the transmission of vibrations of the pump to the housing of the device is suppressed by the pump support due to the elastic support member.

In a preferred embodiment, the pre-suction chamber is enclosed between the elastic support member and a rigid support member of the pump support. Thereby, a lower part of the elastic support member forms a moveable membrane which is designed to be driven by the vibrations of the pump. Accordingly, the lower part of the elastic support member is oscillating with respect to the rigid support member due to the vibrations exerted thereon by the pump. Hence, due to the oscillating movable membrane at the inlet of the pump, the suction efficiency of the pump is increased.

Preferably, the rigid support member is connected to the housing of the device and comprises fluid guiding means. The fluid guiding means may be a duct or tube integrally formed within the rigid support member.

It should be noted that when there is only one pump support connected to the liquid inlet of the pump, all the vibrations of the pump can be used to drive the pre-suction chamber of the pump. However, it may as well be possible to provide an additional pump support at the liquid outlet of the pump to further dampen and suppress the transmission of vibrations from the pump to the housing of the device or other parts arranged within the device.

In a third aspect, the invention proposes a device for the preparation of a liquid food or beverage composition, the device comprising: a housing, a pump comprising a pump chamber that vibrates during use, in particular a pump chamber containing a piston moveably mounted therein, the pump further comprising a liquid inlet and a liquid outlet, a liquid supply which is in fluid connection with the liquid inlet of the pump, a rigid duct which is connected to the liquid inlet and/or outlet of the pump by means of a connector, wherein the connector comprises at least one elastic sealing member designed to absorb vibrations from the pump and to enable a relative movement of the duct and the liquid inlet and/or outlet of the pump.

With a device according to this invention, it is possible to provide a liquid to portioned ingredients housed within the beverage preparation chamber and to hence enable an interaction of the ingredients and the liquid to form a liquid comestible, for example a soup or a beverage. Thereby, liquid from the liquid supply is provided to the beverage preparation chamber by means of the pump of the device.

During operation of the device, as there is an elastic sealing member provided between the duct and the pump of the device, vibrations of the pump are absorbed and thus, a transmission of vibrations from the pump to the beverage preparation chamber, to the liquid supply or to other parts of the device connected to the liquid outlet or the liquid inlet of the pump is prevented. Moreover, as a relative movement of the duct and the liquid outlet and/or inlet of the pump is enabled by the described embodiment, the absorption of vibrations emitted by pump can be further enhanced.

Moreover, due to the application of rigid ducts within the device, flexible deformable ducts, such as silicon tubes, are avoided and thus, the pump and the duct may be assembled without human intervention and can be carried out automatically.

In a preferred embodiment, the connector is designed to pivotally connect the duct and the liquid outlet and/or the liquid inlet of the pump. Hence, as a pivotal movement of the duct with respect to the liquid outlet and/or liquid inlet of the pump is enabled, the absorption of axial and lateral vibrations of the pump is enhanced. Accordingly, an effective absorption of vibrations of the pump is enabled independent of the type of pump. Hence, axial, lateral and rotative vibrations are absorbed.

Preferably, the connector further comprises fastening means, such as a clip, designed to secure the position of the elastic sealing member of the connector. Accordingly, a stable and fluid tight connection is established between the pump and the duct by means of the connector.

The fastening means are preferably detachable such that the maintenance and the exchange properties of the pump and the duct are enhanced.

In addition, the pump support is preferably connected to the liquid inlet of the pump. Thereby, the pump support preferably comprises an elastic support member such as an elastic bellow-shaped support member.

Hence, as the pump is resiliently mounted within the housing of the device, for example by means of the elastic support member at its liquid inlet and by means of the elastic sealing member at its liquid outlet and/or its liquid inlet, vibrations of the pump can be effectively dampened or substantially suppressed. Thus, a transmission of vibrations from the pump chamber to other parts of the device is suppressed.

BRIEF DESCRIPTION OF THE DRAWINGS

Further features, advantages and objects of the present invention will become apparent for the skilled person when reading the following detailed description of embodiments of the present invention, when taking in conjunction with the figures of the enclosed drawings.

FIGS. 3a and 3b show a perspective view of a preferred embodiment of the connector used for connecting the tube members and the pump according to the present invention.

FIG. 4a shows a sectional side view of a preferred embodiment of the connector used for connecting the tube members and the pump according to the present invention.

FIG. 4b shows an exploded assembly drawing of a preferred embodiment of the connector according to FIG. 4a.

DETAILED DESCRIPTION OF EMBODIMENTS

Figure 1:
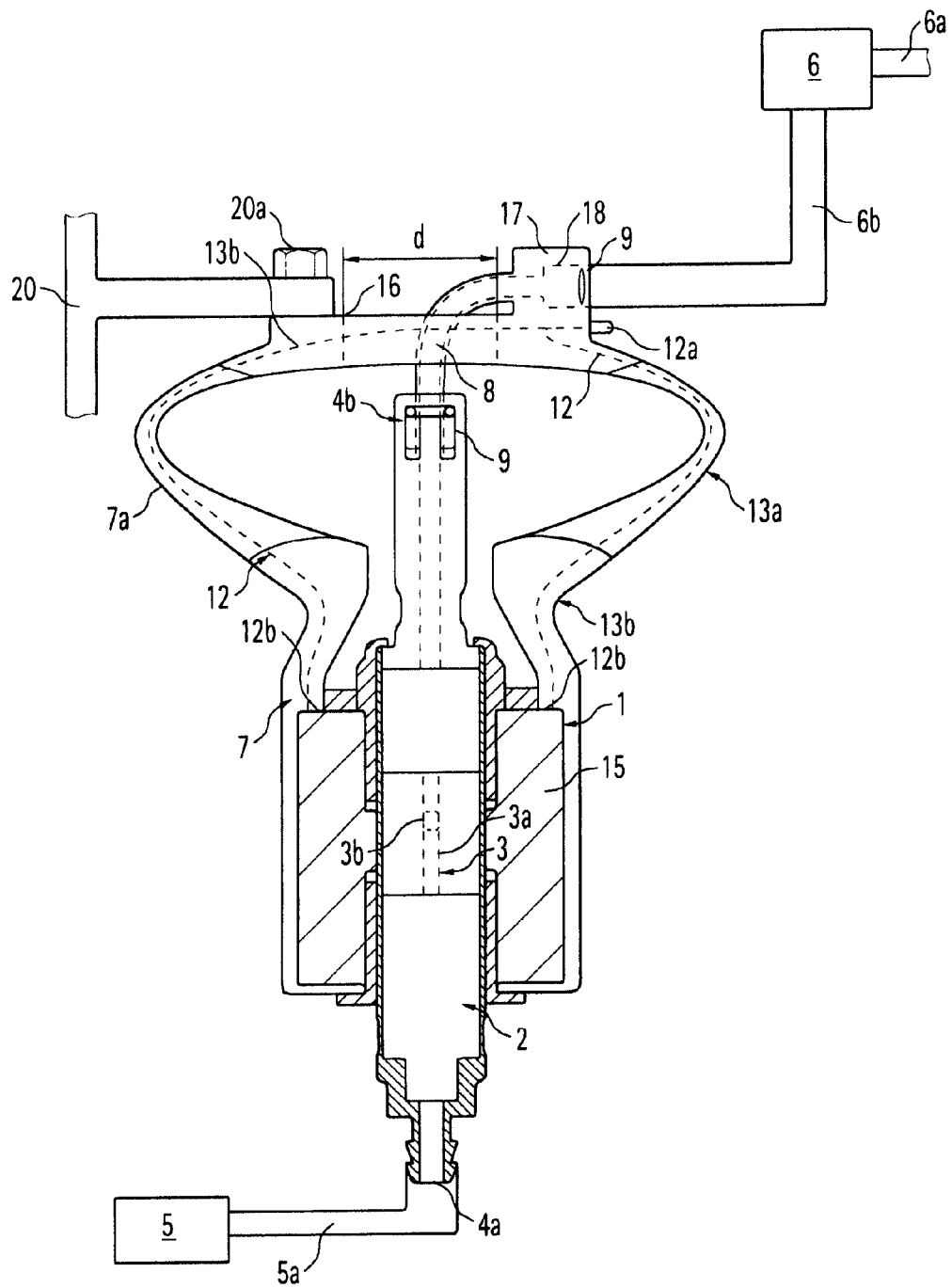
FIG. 1 shows a preferred embodiment of the pump and a support member being connected to the liquid outlet of the pump according to the present invention.

FIG. 1 shows a sectional side view of a preferred embodiment of a pump 1 according to the present invention. The pump 1 is preferably a vibrating pump known in the field of beverage preparation machines. Thereby, a piston 3 is movably mounted within a pump chamber 2. Preferably, at least one spring (not shown) is provided within the pump chamber 2 in order to exert a force on the piston 3. Moreover, electromagnetic solenoid 15 is provided in the periphery of the pump chamber 2 in order to interact with the piston 3. Hence, an axial reciprocating movement of the piston 3 within the pump chamber 2 is enabled due to activation by means of the solenoid 15. The pump chamber 2 is connected to a liquid inlet 4a and a liquid outlet 4b of the pump 1. The piston 3 comprises at least one bore 3a which can be selectively closed by at least one valve 3b in order to pump liquid from the liquid inlet 4a to the liquid outlet 4b of the pump 1 during the reciprocating movement of the piston 3.

Instead of the shown pump 1 any other pump may be used within the device in order to pump liquid from a liquid inlet 4a to the liquid outlet 4b. In particular, the present invention may also be applied for pumps of the rotary type which are commonly used in beverage preparation devices.

As schematically shown in FIG. 1, the liquid inlet 4a of the pump 1 is in fluid connection with a liquid supply 5. The liquid supply 5 is preferably connected to the liquid inlet 4a by means of a hose or tubular member 5a. The liquid supply may be a liquid reservoir which is preferably connected to the device in a detachable manner. Moreover, the liquid supply may be a connection to a water tap.

The liquid outlet 4b of the pump 1 is in fluid connection to a beverage preparation chamber 6 of the device. Hence, liquid under pressure can be supplied by means of the pump 1 to the beverage preparation chamber 6 in order to interact with portioned ingredients housed by the beverage preparation chamber 6 to form a liquid comestible such as a soup or a beverage. The liquid comestible may then be discharged by an outlet passage 6a to a receptacle (not shown) such as a vessel or a cup provided by an operator of the device.

The pump 1 is mounted within the housing 20 of the device by means of a pump support 7. The support 7 is preferably connected to the pump chamber 2 and/or the solenoid 15 of the pump 1. The support 7 is preferably connected to the pump 1 in a detachable manner. Accordingly, the maintenance of the pump and the exchange of the pump and the support 7 are facilitated. The support member is preferably made of plastics. Moreover, the support 7 may as well be formed as an integral part of the pump 1, for example by overmoulding of the pump 1.

The support 7 comprises an elastic bellow-shaped support member 7a. The support member 7a is preferably of plastics and is an integral part of the support 7. In a preferred embodiment, the bellow-shaped support member 7a comprises at least one soft portion 13a and two rigid portions 13b which are formed as integral parts of the soft portion 13a. The soft portion 13a is preferably arranged between the two rigid second portions 13b. In a preferred embodiment, a first rigid portion 13b is connected to the pump 1 of the device and a second rigid portion 13b is preferably in connection with the housing 20 of the device. Hence, the soft portion 13a is sandwiched between the two rigid portions 13b. Moreover, as shown by the dark hatching in FIG. 1, the soft portion 13a constitutes the outer peripheral portion of the bellow-shaped support member 7a.

The second rigid portion 13b and the housing 20 are preferably connected by connection means 20a. The connections means 20a may be any connection suitable for providing a stable connection between the pump 1 and the housing 20. In particular, the connections means 20a may be a screw fitting, a clamp fitting or an adhesive fitting.

As the bellow-shaped elastic support member 7a is arranged between the housing and the pump 1, the transmission of vibrations during operations of the pump 1 can be effectively suppressed. Moreover, the vibrations of the pump 1 are substantially absorbed by the elastic bellow-shaped support member 7a which enables a movement of the pump 1 in three degrees of freedom.

In order to enable a connection of the pump 1 to the beverage preparation chamber 6, the rigid portion 13b of the support member 7a connected to the housing 20 comprises an aperture 16 of a predefined diameter d. Thus, a duct 8 can be connected to the liquid outlet 4b of the pump 1.

During operation of the pump, pump piston 3 vertically reciprocates in pump chamber 2 which then vibrates correspondingly. Such vibrations are then communicated to elastic support member 7a that deforms in a corresponding generally vertical motion by flexions around three flexion axes 11a, 11b, 11c in member 7a to absorb such vibrations and prevent communication of the vibrations to housing 20.

The pump support 7 preferably comprises electric connection means 12 which are integrated into the bellow-shaped support member 7a. Thereby, the electric connection means 12 are connected to the pump 1 of the device. The electric connection means 12 are preferably wires guided within the support 7. Hence, the electric connection means 12 are insulated by the pump support 7. An integrated connector 12b is connected to at least the solenoid 15 of the pump in order to supply the pump 1 with current.

Moreover, the support member 7a preferably comprises a connector 17 which is integrated into the support member 7a. Said connector 17 preferably comprises a connection member 18 for connecting the duct 8 which is in fluid connection with the outlet 4b of the pump 1 to an additional duct or tube member 6b in fluid connection with the beverage preparation chamber 6. Moreover, the connector 17 preferably comprises connection means 12a for connecting the electrical connection means 12 housed by the support 7 to a power supply (not shown) of the device. As the connector 17 comprises both, the connection for the power supply, as well as the liquid connection of the pump 1, a very integrated and space saving embodiment is obtained. Accordingly, a simplified assembly of the systems is enabled, since the liquid and electric connection of pump 1 can be assembled in the same step.

The duct 8 is preferably connected to the outlet 4b of the pump by means of a connector 9 which is designed to absorb vibrations from the pump and to enable a relative movement of the duct 8 and the liquid outlet 4b. Hence, duct 8 can be designed as being a rigid member which does not require human intervention for the assembly process but allows automation thereof. Thereby, the vibrations of the pump can effectively be suppressed from being transmitted via the rigid duct or tube members 8 to other parts within the device. Optionally, the tube member 6b and the duct 8 may also be connected by means of the connector 9 according to the invention, to further suppress the transmission of vibrations from the pump 1. A detailed description of the connector 9 will be given with respect to FIGS. 3a, 3b, 4a and 4b.

Figure 2:
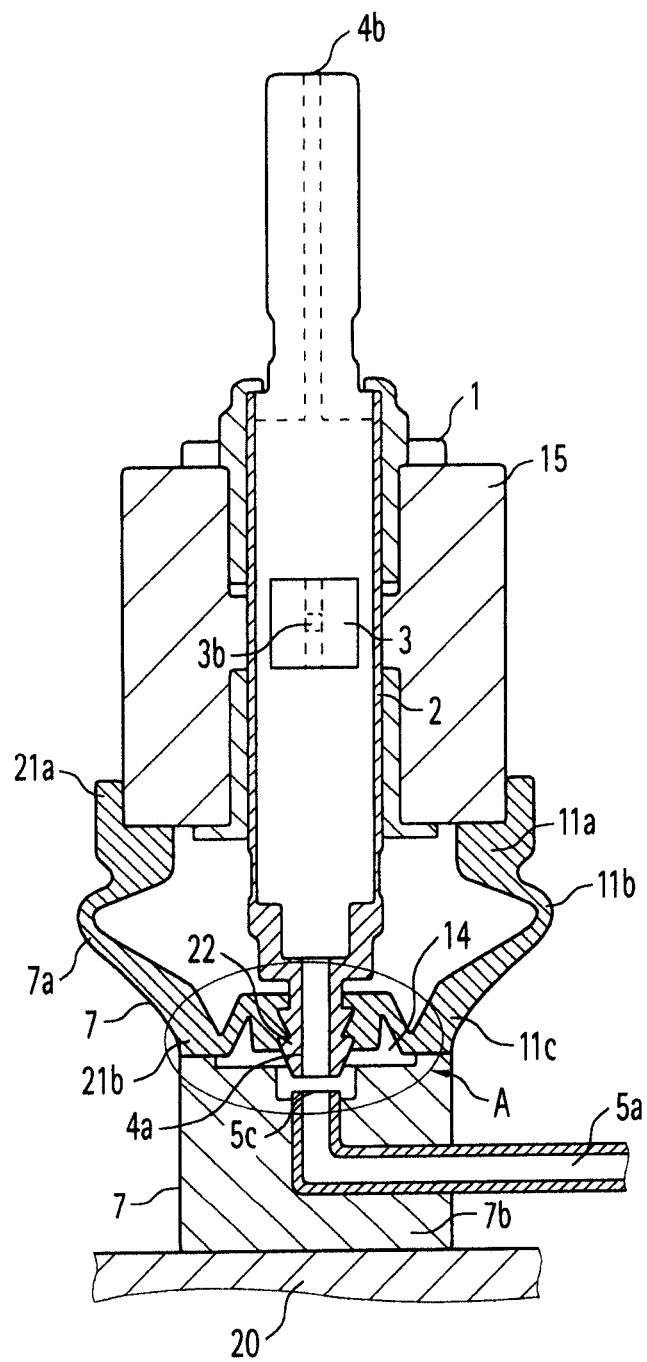
FIG. 2 shows a preferred embodiment of the pump and a pre-suction chamber being disposed at the liquid inlet of the pump according to the present invention.

FIG. 2 shows a sectional side view of another preferred embodiment of the pump and a pre-suction chamber being disposed at the liquid inlet of the pump. Thereby, the pre-suction chamber 14 in section A as indicated in the figure is enclosed by the pump support 7.

The pump support 7 comprises a rigid member 7b and an elastic bellow-shaped member 7a. The bellow-shaped support member 7a is connected to the pump 1. Thereby, the connection between the bellow-shaped support member 7a and the pump 1 may be a press fitting, a screw fitting or the like, suitable for stably connecting the elastic support member 7a to the pump 1.

As shown in FIG. 2, the elastic support member 7a is connected to a rigid support member 7b which is connected to the housing 20 of the device. Hence, the pump 1 is mounted by means of the support members 7a and 7b of the pump support 7 at the housing 20 of the device.

The elastic support member 7a is connected to the liquid inlet 4a of the pump 1. In particular, an upper part 21a of the elastic support member 7a is connected to the solenoid 15. Thereby, the connection between the solenoid 15 and the upper part 21a of the elastic support member 7a is established by dedicated connection means such as a press fitting or the like, suitable for transmitting vibrations from the pump 1 to the elastic support member 7a.

A lower part 21b of the elastic support member 7a is connected to the liquid inlet 4a. In addition, said lower part 21b of the elastic support member 7a is connected to the rigid support member 7b.

The connection between the elastic support member 7a and the rigid support member 7b as well as with the inlet 4a of the pump 1 is a fluid tight connection. The lower part 21b of the elastic support member 7a comprises an aperture 22 through which the inlet 4a of the pump 1 is inserted. Thereby, the inlet 4a and the lower part 21b preferably comprise sealing means. The sealing means may be a ripped profile or an O-ring disposed between the lower part 21b and the inlet 4a.

Furthermore, the lower part 21b is connected to the rigid support member 7b by dedicated connection means (not shown). These connection means may be a press fitting, a clamp or screw fitting, or an adhesive fitting.

As shown in FIG. 2, the pre-suction chamber 14 is formed between the lower part 21b of the elastic member 7a and the rigid support member 7b. The pre-suction chamber 14 comprises an inlet 5c which is in connection with a liquid supply member 5a connected to the liquid supply. The outlet of the pre-suction chamber corresponds to the inlet 4a of the pump 1.

As the pre-suction chamber 14 is formed between the lower part 21b of the elastic member 7a and the rigid member 7b, the elastic lower part 21b constitutes a membrane at one side of the pre-suction chamber 14.

The elastic support member 7a comprises due to its bellow-shaped embodiment three flexion axes 11a,11b,11c. Accordingly, the elastic support member 7a enables a relative movement of the pump with respect to the rigid support member 7b in all three degrees of freedom.

During operation of the pump 1, vibrations are transmitted from the pump 1 to the elastic support member 7a and are substantially absorbed by said support member 7a. Due to these vibrations, the lower part 21b of the elastic support member 7a vibrates which leads to an oscillating alteration of the volume of the pre-suction chamber 14. Hence, according to the alteration of the volume, liquid is sucked from the inlet 5c which is in fluid connection to a liquid supply of the device into the pre-suction chamber 14 and from there, the liquid is supplied in an intermittent way to the liquid inlet 4a of the pump 1. Hence, the drawing of water from the liquid supply 5a by the pump 1 is enhanced due to the oscillating movement of the elastic support member 7a. Accordingly, the suction efficiency of the pump 1 is increased.

As the pump 1 is connected to the housing 20 only by the described support 7, all the vibrations of the pump 1 are absorbed to enhance the suction efficiency of the pump 1. However, an additional support may be connected to the pump 1 in order to mount the pump 1 within the housing 20 of the device in a stable manner. Thereby, such an additional support preferably comprises an elastic bellow-shaped support member according to the invention.

FIGS. 3a and 3b show a perspective view of a preferred embodiment of the connector 9 for connecting the rigid duct, in particular tube members 8, of the device. Moreover, the shown connector 9 is preferably used for connecting the pump 1 and the tube members 8 of the device.

Each of the tube members 8 comprises a bore 8a for guiding liquid within the tube members 8. The bore 8a of each tube member 8 is connected to a circular support 10a of the tube member 8. The connector 9 is preferably formed as an integral part of each tube member 8.

The circular support 10a is preferably a circular recess of a diameter d2 which is wider than an outer diameter d1 of the tube member 8. The circular support 10a is thus designed for receiving a tube member 8.

As can be seen in FIG. 4a, the connector 9 further comprises an elastic sealing member 10 which is mounted at the circular support 10a of the tube member 8. The elastic member 10 is preferably an O-ring or the like, suitable for sealing the connector 9.

Moreover, the connector 9 comprises fastening means 23 which interact with a tube member 8 to be connected to the connector 9. The fastening means 23 is preferably a locking ring or clip interacting with a preferably circular groove 23b provided at a lateral surface of the tube member 8 to be connected to the connector 9. Thereby, the locking ring 23 is held by a recess 23a provided at the connector 9. Hence, due to the fastening means 23, a stable connection between two tube members 8 is enabled.

The connector further comprises a chamfered portion 10b which connects the bore 8a and the circular support 10a.

When a tube member 8 is connected to the connector 9, the tube member 8 is supported within the circular support 10a only by means of the elastic sealing member 10 and by the fasting means 23. Thereby, the chamfered portion 10b ensures that a pivotally motion of the tube member 8 with respect to the connector 9 is enabled.

As shown in FIG. 4b, for the assembly of two tube members 8, the elastic sealing member 10 is introduced into the circular support 10a of the connector 9. Then, the tube member 8 is introduced into the circular support 10a. The position of the tube member 8 with respect to the connector 9 is secured by fastening means 23 which are slid into the dedicated recess 23a. The fasting means 23 and the chamfered portion 10b of the connector 9 are designed to enable a pivotally movement of the tube member 8 within the connector 9. Thereby, the position of the elastic sealing member 10 within the connector 9 is secured by the fastening means 23.

According to this embodiment, a relative motion of the tube members 8 with respect to each other is enabled. Hence, vibrations exerted thereon may effectively be suppressed. Moreover, due to the elastic sealing member 10 arranged between the tube members 8, the suppression of vibrations is even further enhanced.

The described embodiment of the tube members 8 and the connector 9 is preferably used to connect the pump 1 of a device according to the present invention to tube members of the device. Hence, vibrations of the pump are effectively absorbed due to the described embodiment of the connector 9. The transmission of vibrations from the pump 1 to other parts within the device such as the beverage preparation chamber 6 or the liquid supply 5 can thus be prevented.

Moreover, by providing the described arrangement, comprising a rigid tube member 8 instead of a flexible tube member being connected to vibrating pump 1, the assembly process of pump 1 and tube member 8 may be automated. Hence, human intervention during assembly process can be prevented and thus, the assembly costs of the device can be reduced.

Although the present invention has been described with reference to preferred embodiments thereof, many modifications and alternations may be made by a person having ordinary skill in the art without departing from the scope of this invention which is defined by the appended claims.

What is claimed is:

1. A device for the preparation of a liquid food or beverage from a portioned ingredient placed within a beverage preparation chamber, the device comprising:

a housing, a pump comprising a pump chamber that contains a piston moveably mounted therein and vibrates during use, for displacing a liquid from a pump inlet to a pump outlet, a liquid supply which is in fluid connection with the liquid inlet of the pump, and a pump support securing the vibrating pump chamber to the housing, a duct that is mechanically connected to the housing and to one of the pump inlet or pump outlet and that is arranged to guide liquid from or to the pump, wherein the pump support comprises an elastic support member for resiliently supporting the vibrating pump chamber in the housing, and wherein the duct is rigid and connected with the pump inlet or pump outlet by an elastic sealing member for resiliently connecting the rigid duct to the vibrating pump chamber.

2. The device of claim 1, wherein the portioned ingredient is provided in capsules that are placed within the beverage preparation chamber and the device introduces liquid into the capsules for preparation of the liquid food or beverage.

3. The device of claim 1, wherein the elastic support member comprises at least one elastic leaf member for resiliently supporting the pump, with the elastic support member being optionally arranged to be deformable around a plurality of flexion axes to absorb vibrations from the pump chamber, with the plurality of flexion axes oscillating in opposition to one another.

4. The device according to claim 1,
wherein the elastic support member is arranged to absorb vibrations exerted on the support member in all three degrees of freedom.

5. The device according to claim 1,
wherein the elastic support member is formed as an integral part of the pump support.

6. The device according to claim 1, wherein the elastic support member comprises electric connections for connecting the pump of the device with the electric connections incorporated into the elastic support member.

7. The device according to claim 1,
wherein the pump support is connected to the liquid inlet or the liquid outlet of the pump.

8. The device according to claim 1,
wherein the rigid duct is connected to the liquid outlet of the pump by means of a connector comprising the elastic sealing member to resiliently connect the pump chamber to the rigid duct.

9. A device for the preparation of a liquid food or beverage comprising:
a housing,
a pump comprising a pump chamber that contains a piston moveably mounted therein
and vibrates during use, and including a liquid inlet and a liquid outlet,
a liquid supply which is in fluid connection with the liquid inlet of the pump, and
a rigid duct which is connected to the liquid inlet or outlet of the pump by means of a connector comprising at least one elastic sealing member designed to absorb vibrations from the pump and to enable a relative movement of the duct and the liquid inlet or outlet of the pump.

10. The device according to claim 9, wherein the connector is designed to pivotally connect the duct and the liquid inlet or outlet of the pump.

11. The device according to claim 9, wherein the connector further comprises fastening means designed to secure the position of the elastic member of the connector.

12. The device of claim 1, which further comprises a pre-suction chamber connected to the liquid inlet of the pump and being designed to intermittently provide liquid to the liquid inlet of the pump.

13. The device according to claim 12,
wherein the pre-suction chamber is designed to be driven by the vibrations of the pump.

14. The device according to claim 12,
wherein the pre-suction chamber is at least partially enclosed by an elastic support member associated with pump support and disposed at the liquid inlet of the pump.

15. The device according to claim 14,
wherein the pump support further comprises a rigid support member and wherein the pre-suction chamber is enclosed by the elastic support member and said rigid support member.

16. The device according to claim 14, wherein a lower part of the elastic support member forms a moveable membrane which is designed to be driven by the vibrations of the pump.

17. The device according to claim 8, wherein the connector is designed to pivotally connect the duct and the liquid inlet or outlet of the pump.

18. The device according to claim 8, wherein the connector further comprises fastening means designed to secure the position of the elastic member of the connector.

19. A device for the preparation of a liquid food or beverage from a portioned ingredient placed within a beverage preparation chamber, the device comprising:
a housing,
a pump comprising a pump chamber that contains a piston moveably mounted therein and vibrates during use, for displacing a liquid from a pump inlet to a pump outlet,
a pre-suction chamber connected to the liquid inlet of the pump and being designed to intermittently provide liquid to the liquid inlet of the pump,
a liquid supply which is in fluid connection with the liquid inlet of the pump, and
a pump support securing the vibrating pump chamber to the housing,
a duct that is mechanically connected to the housing and to one of the pump inlet or pump outlet and that is arranged to guide liquid from or to the pump,
wherein the pump support comprises an elastic support member for resiliently supporting the vibrating pump chamber in the housing,
wherein the pre-suction chamber is at least partially enclosed by an elastic support member associated with the pump support and disposed at the liquid inlet of the pump, and
wherein the duct is rigid and connected with the pump inlet or pump outlet by an elastic sealing member for resiliently connecting the rigid duct to the vibrating pump chamber, wherein the elastic sealing member pivotally connects the duct and the liquid inlet or outlet of the pump, and the device includes fastening means that secures the position of the elastic sealing member of the connector.

* * * * *